April 22, 1941.  W. S. PARSONS  2,238,983
CHART MECHANISM FOR RECORDING INSTRUMENTS
Filed July 26, 1939  2 Sheets-Sheet 1
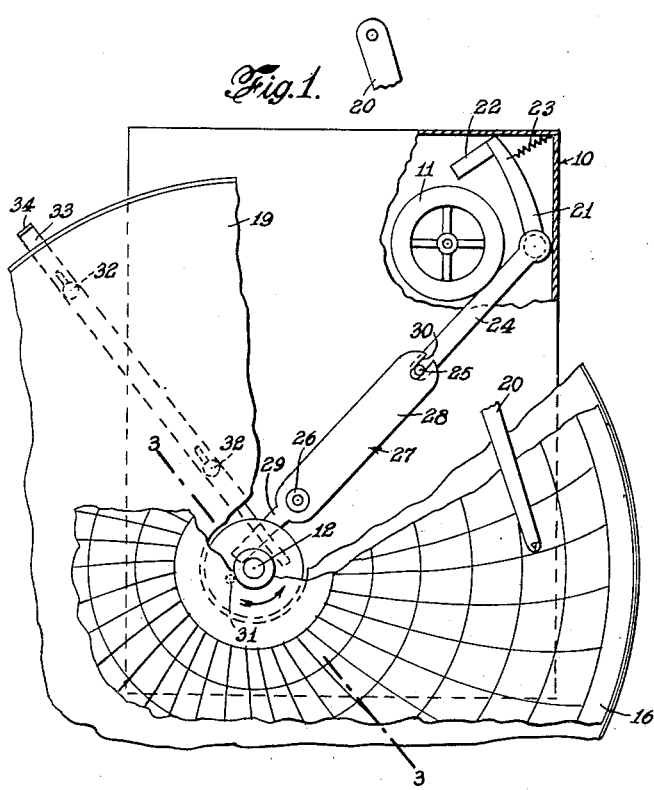
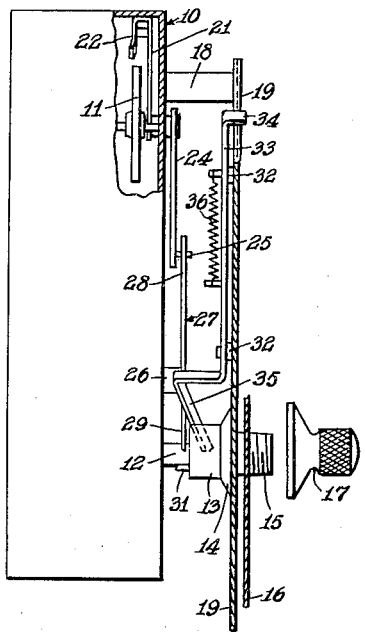
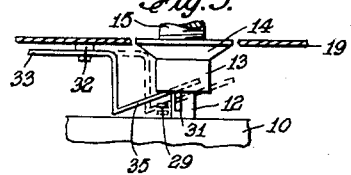
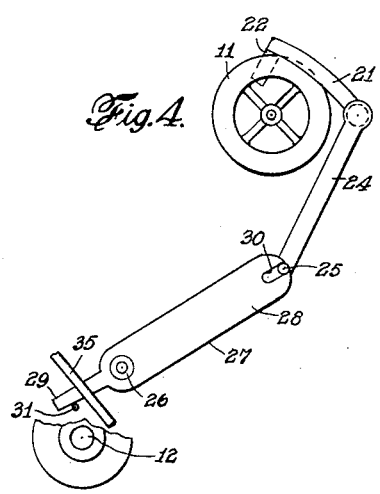
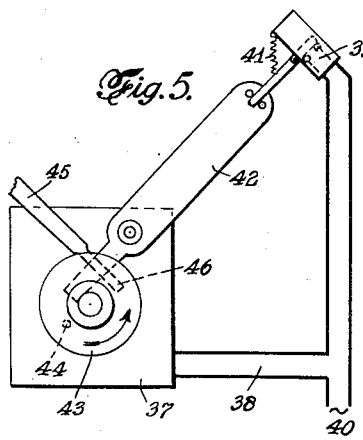
INVENTOR.
WALTER S. PARSONS
BY
ATTORNEY.

INVENTOR.
WALTER S. PARSONS
BY
ATTORNEY.

Patented Apr. 22, 1941

2,238,983

UNITED STATES PATENT OFFICE 2,238,983

CHART MECHANISM FOR RECORDING INSTRUMENTS

Walter S. Parsons, Naugatuck, Conn., assignor to The Bristol Company, Waterbury, Conn., a corporation of Connecticut Application July 26, 1939, Serial No. 286,514

3 Claims. (Cl. 234—75)

This invention relates to recording or graphic instruments, and more especially to a device for stopping the progressive travel of a chart used with such an instrument at the termination of a predetermined interval of time. In recording instruments of the "circular chart" or of the "drum chart" class, a chart, usually of paper, and having a surface adapted to receive a record of values of the measured magnitude, is attached to a suitable driving mechanism, generally in the nature of a clock, and is caused to rotate continuously beneath a pen or stylus until it has made one complete revolution, the predetermined time as a rule being 24 hours, 7 days, or some other selected interval. The satisfactory operation of an instrument of this class requires that it be subjected to periodic service, and that upon the completion of one revolution of the record, the chart be replaced by an attendant. In the event of the attendant's failing to change the chart at the proper time, the record will be continued for a part of a second revolution; and in many instances the confusion caused by the presence of two superimposed lines on the chart will be more objectionable than will the omission of the record for that time elapsing after one revolution has been completed.

It has been proposed to provide in instruments of this class a detent to be engaged by the chart the chart arbor in its rotation, definitely stalling the clock, or in the case of electrically-driven timing elements, opening the power supply by means of a switch. While these expedients have been to some extent effective, they are subject to the objection that it has been found necessary to lose the record for a certain time corresponding to the width of the detent as measured in the direction of chart travel, while in the forms definitely stalling a spring-driven clock, the parts of the mechanism are likely to be subjected to severe stresses, sometimes sufficient to damage the mechanism of the clock. A further objection has been noted, that some of these devices are positioned in front of the chart, preventing an unobstructed view of the record.

It is an object of this invention to provide a device for stopping the chart rotation of a graphic instrument upon the expiry of a predetermined period, and at the same time permitting of restarting of the record without error in the timesetting of the chart.

It is a further object to provide a device of the above nature in a form wholly free of any parts which might obstruct the view of the chart.

A still further object is to provide such a device in a form to assist in the starting of clocks of the escapement type.

Another object is to provide such a device operable in a manner to subject the mechanism to no undesirable stresses.

In carrying out the invention, means are provided in connection with the chart driving means whereby such driving means are automatically stopped at a predetermined point in its travel, as represented by a predetermined point on the chart; and suitably actuated means when operative serve to disengage the means inhibiting operation of the driving means, with the latter remaining in the position in which it was brought to rest.

The nature of the invention, however, will best be understood when described in connection with the accompanying drawings, in which:

Fig. 1 is a fragmentary front elevation, with portions broken away, of the chart mechanism of a recording instrument of the "circular chart" type embodying the invention, and as adapted to a clock having an escapement.

Fig. 2 is a side elevation and part vertical section of the same, showing the parts in their normal running positions.

Fig. 3 is a view, partly in section, taken on the line 3—3, Fig. 1,

Fig. 4 is a fragmentary front elevation showing some of the parts in their positions adapted to stop the timing mechanism.

Fig. 5 is a fragmentary front elevation illustrating a modified form of the invention as adapted to an electrically driven timing mechanism.

Figure 6:
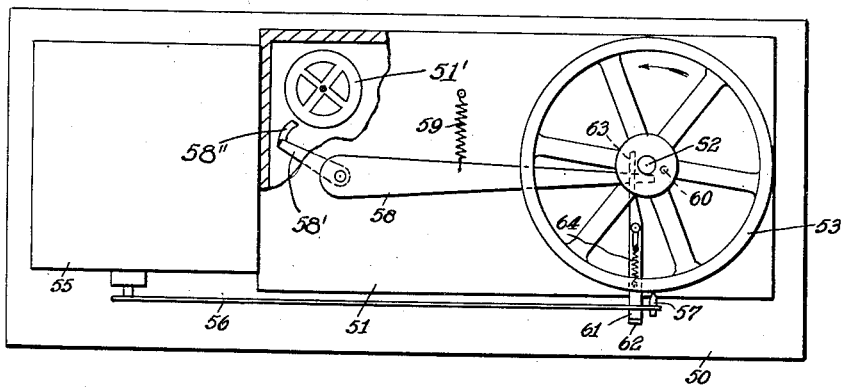
Figure 7:
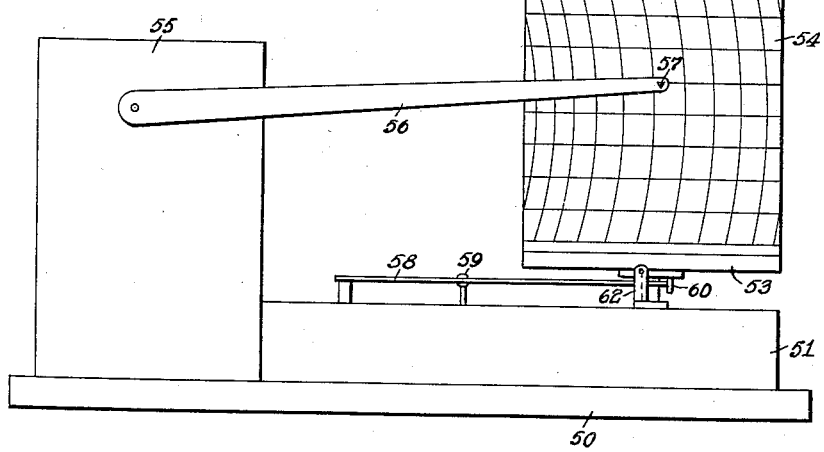
Figure 8:
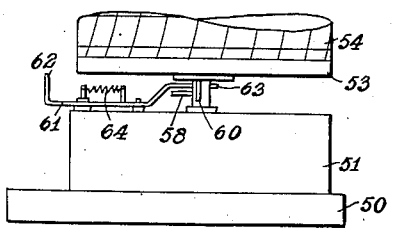

Figs. 6, 7, and 8 are respectively a plan, front elevation, and fragmentary end elevation of a form of the invention, as applied to a recording instrument of the "drum chart" type.

Referring now to the drawings, and especially to the form shown in Figs. 1 to 4, there is shown a clock mechanism 10 of the spring-driven class, having a balance-wheel 11 of the conventional type, and a time shaft 12 adapted to be rotated at a constant speed (for example, one revolution in 24 hours) by said mechanism. This shaft carries thereon an arbor or hub 13 having a flanged portion 14 and a centrally disposed and threaded boss 15, whereby a circular paper chart 16 may be centered against the flange and clamped thereto by a thumb-nut 17 engaging the threads of the boss. Axially disposed with relation to the axis of the shaft 12, and mounted in fixed relationship to the clock, as by supporting posts 18, is a flat circular platen 19 adapted to form a guide for the paper chart, and to provide a backing for the same when a record is being inscribed thereon by a pen or stylus 20.

Pivotally mounted within the clock mechanism case is an arm 21 carrying a resilient friction pad 22 juxtaposed to the balance-wheel 11, and adapted in one of its positions to engage the rim of the same in a sense tangential to its angular oscillatory movement, thereby frictionally stalling the wheel from movement when engaged therewith, and imparting thereto a rotary impulse when suddenly released therefrom. The pad 22 is normally maintained out of engagement with the wheel 11 by means of a spring 23 extended between the arm 21 and a fixed part of the clock casing. Attached to the arm 21, and rotatable therewith, is a lever-arm extending outside the casing of the clock in a direction toward the time shaft 12, and carrying on its extended end a perpendicularly projecting pin 25. Carried by a post 26 located intermediate the mounting of the arm 21 and the shaft 12, and pivotally mounted upon said post for angular deflection in a plane perpendicular to said shaft, is a lever 27 having oppositely disposed extended arms 28 and 29. The arm 28 is extended toward the mounting of the arm 21, and has at its extremity a slot 30 adapted to engage the pin 25 for operation of the lever-arm 24. The arm 29 is extended to pass in close proximity to the shaft 12 between the arbor 13 and the clock mechanism. The arm 29, while substantially rigid in its normal plane of movement, is made resilient in a sense perpendicular to that plane, so that, upon the application of pressure in such a sense, it will be deflected out of its normal plane of action, springing back into said plane when the pressure is removed.

Projecting from the rearward face of the arbor 13 is a pin 31, adapted to engage the arm 29 of the lever 27 as the arbor rotates in the direction of the arrow in Fig. 1, causing the lever to be deflected toward the left as seen in the drawing. Slidably mounted on studs 32 carried on the rearward face of the platen 19 is an arm 33 extending from an inner end near the shaft 12 to an outer end beyond the periphery of the platen 19, and there having a turned-up portion 34 adapted for manual actuation of the arm 33 in a longitudinal sense. The inner end of the arm 33 is offset, and carries a part 35 having a sloping face, positioned in juxtaposition to, but normally clear of, the arm 29 of the lever 27, being so retained by a spring 36 holding the arm 33 in its extreme outward position. The conformation of the part 35, and its positioning relative to the lever-arm 29, are made such that upon the arm 33 being depressed, as by pressure on the end 34, and the spring 36 yielding to permit of such motion, the sloping edge of the part 35 will engage the resilient arm 29 of the lever 27, forcing it out of its normal plane of action in a sense parallel to the pin 31.

The action of the device will be understood by a comparison of Figs. 1 and 4, in which is shown the mechanism in positions corresponding to normal operation, and to stoppage, respectively, of the clock mechanism 10. As seen in Fig. 1, the spring 23 withholds the friction pad 22 from engagement with the balance-wheel 11 and also maintains the lever system in a position where the arm 29 of the lever 27 lies in the path of the pin 31 as the latter is carried about the shaft 12 by rotation of the arbor 13. As the pin 31 is brought into engagement with the arm 29, as indicated in Fig. 4, and continues along its path, the lever 27 will be deflected through a limited angle about its point of pivoting on the post 26. This motion, communicated by the slot 30 and the pin 25 to the lever-arm 24, will cause the arm 21 to be deflected in opposition to the force of the spring 23, and the pad 22 to engage the rim of the balance-wheel 11, as shown in Fig. 4, stopping the clock mechanism and bringing the record chart to rest, which condition will be maintained until the superposition of manual operation.

In order to re-start the clock mechanism, as would be done after placing a new chart on the arbor, pressure is applied to the end 34 of the arm 33, causing the same to be moved against the influence of the spring 36, and the sloping edge of the part 35 to be brought into engagement with the resilient arm 29 of the lever 27, forcing the same out of its normal plane of action to an extent that it will slip over the end of the pin 31. The lever system thus being released, the force of the spring 23 will immediately restore the parts to the position shown in Fig. 1; and at the same time the snap action of the mechanism quickly withdrawing the pad 22 from the rim of the balance-wheel 11 in a tangential sense, will impart a rotary impulse to said wheel, immediately establishing normal operation of the clock mechanism.

Thus, there has been provided means for automatically bringing the timing element to rest at a predetermined point in the travel of the chart-driving mechanism, and for manually re-establishing operation of the same without further angular deflection of said mechanism.

In Fig. 5 is shown an adaptation of the same mechanism as hereinbefore described to use in conjunction with an electrically operated chart-driving mechanism. A motor-driven timing element 37 receives electric power through a circuit 38 in series with a switch 39 from a source 40. The switch 39 is normally maintained by means of a spring 41 or other holding device in a closed-circuit position, causing the timing element to operate at a constant speed. A lever 42, similar in all respects to the lever 27 in the embodiment hereinabove described, is mounted in a manner to engage the switch 39 for operation of the same. Carried by the timing element 37 is an arbor 43 adapted for the mounting thereon of a circular chart to receive a record in the conventional manner; and borne upon the rearward face of the arbor is a pin 44 adapted to engage the lever 42, and, as the arbor is rotated, to move the same to a position where the switch 39 will be forced against the influence of the spring 41 to a position of open circuit, thus interrupting the flow of electric power from the source 40 to the motor-driven timing element, and bringing the chart to rest. An arm 45, mounted in a manner identical with the arm 33 in the form of the device hereinabove described, and having a sloping end part 46 adapted to engage the resilient arm of the lever 42, is provided for forcing the lever-arm out of engagement with the pin 44 when manually depressed at the time of changing charts on the instrument. Thus, there has been provided means for bringing the electrically-driven timing element to rest at a predetermined point in the travel of the record chart, and for manually re-establishing operation of the same without further angular deflection of the mechanism.

Figs. 6, 7 and 8 are views of a recording instrument of the "drum chart" type, having the invention incorporated therein. In instruments of this class the record chart takes the form of a rectangular sheet wrapped about a cylindrical drum, and fixed thereto with its two ends juxtaposed, generally in overlapping relationship. While such a disposition of the chart will permit of continuous operation for more than one complete revolution of the drum, a second revolution after completion of the record will be subject to the same objectionable feature as a circular chart, in that the second record will be superimposed upon the first, generally rendering both records illegible.

In the form shown in Figs. 6, 7, and 8, a base 50 carries a timing element 51 having a vertical shaft 52 adapted to be driven at a constant speed (for example, one revolution in 24 hours), either by a spring or by electrical means. Carried by the shaft 52 is a cylindrical drum 53 adapted to have wrapped thereabout and secured thereto a record chart 54. Mounted on the base 50 and adjacent to the timing mechanism 51 is a measuring element 55 adapted to perform a desired measurement on a variable, and to express that measurement as a deflection of an index 56 carrying a pen or stylus 57 to provide on the chart 54 a record of the excursions of said index from a predetermined reference point.

A lever-arm 58 pivotally attached to the timing mechanism is adapted by its deflection to interrupt the action of the same, by actuating a brake on the escapement in a manner similar to that set forth in Figs. 1, 2, 3, and 4, if the timing element be of the spring-driven type, or by actuating a switch as in Fig. 5, if the timing element be electrically driven, said lever-arm being retained in a position to permit operation of the mechanism by means of a spring 59. As shown in Fig. 6, the device is indicated in its application to a clock of the spring-driven class having an escapement including a balance wheel 51'. Secured to the lever-arm 58 and angularly rotatable therewith through a limited angle is an arm 58' having on its extremity a resilient brake member 58" adapted to engage the rim of the balance wheel 51', bringing the clock mechanism to rest when the arm 58 is deflected in a clockwise sense as seen in the drawings, and to be restrained out of engagement with the balance wheel by the influence of the spring 59 when the arm 58 is not so deflected. The lever-arm 58 is made substantially rigid in its normal plane of deflection and resilient in a sense perpendicular to that plane. Borne by the drum 53 is a pin 60 so disposed that as said pin is carried around the shaft 52 by rotation of the drum, it will engage the lever-arm 58, deflecting the same in opposition to the force of the spring 59, stopping the timing element and bringing the drum with its record chart to rest. An extended member 61, slidably mounted on the timing element, is provided with an outer end part 62 suitable for manual manipulation, and with an inner end part 63 having a sloping edge adapted to engage the lever-arm 58, deflecting it from its normal plane of action sufficiently to clear the pin 60. The member 61 is retained in its position of disengagement from the lever-arm 58 by a spring 64.

In operation, the drum in its rotation carries the pin 60 into engagement with the lever-arm 58, deflecting the same and stopping the chart travel as hereinbefore set forth. In order to restart the clock, the part 62 of the member 61 is manually pressed, displacing the member 61 in opposition to the force of the spring 64, causing the sloping edged part 63 to engage the resilient lever-arm 58 and displacing it sufficiently to clear the pin 60, whereupon the spring 59 will immediately restore said lever-arm to its normal position, re-starting the timing mechanism without further angular displacement of the drum.

It will be apparent that in any of the forms of the invention as set forth, since the position of the chart-carrying element at the moment of re-starting is unchanged from that at which it came to rest, the chart will make exactly one revolution before again being brought to rest. The time till stoppage will therefore be precisely determined as that representing one complete revolution of the chart mounting, and thus may be predetermined at the time of starting the instrument.

I claim:

1. Means for controlling in a graphic instrument a timing device for a chart-carrying element associated with a marking member for inscribing a record on the chart, said means including an element for inhibiting the action of said timing device to bring the same to rest, a spring normally restraining the inhibiting element from operating to inhibit said action, a lever for actuating said element in opposition to said spring, said lever being substantially rigid in its normal plane of action and adapted to yield in a sense perpendicular to said plane, a member moving with said chart-carrying element in definite predetermined relationship to a selected time-position on said chart, and adapted to engage said lever to deflect it in its normal plane of action in opposition to said spring, whereby said chart may be brought to rest with said selected time position in a definite relationship to said marking member, and manually actuated means to displace a part of said lever perpendicularly to said plane, said lever yielding to permit such displacement and thereby being disengaged from said moving member and rendering said inhibiting element inoperative.

2. Means for controlling in a graphic instrument a clock for timing a chart-carrying element associated with a marking member for inscribing a record on the chart, said means including an element for braking said clock to bring the same to rest, a spring normally rendering said braking element inoperative, a lever for actuating said element in opposition to said spring, said lever being substantially rigid in its normal plane of action and adapted to yield in a sense perpendicular to said plane, a member moving with said chart-carrying element in definite predetermined relationship to a selected time-position on said chart, and adapted to engage said lever to deflect it in its normal plane of action in opposition to said spring, whereby said chart may be brought to rest with said selected time position in a definite relationship to said marking member, and manually actuated means to displace a part of said lever perpendicularly to said plane, said lever yielding to permit such displacement and thereby being disengaged from said moving member and rendering said braking element inoperative.

3. Means for controlling in a graphic instrument an electric motor for timing a chart-carrying element associated with a marking member for inscribing a record on said chart, said motor having an energizing circuit and a switch in said circuit, a spring normally tending to actuate said switch to cause said motor to operate, a lever for actuating said switch in opposition to said spring, said lever being substantially rigid in its normal plane of action and adapted to yield in a sense perpendicular to said plane, a member moving with said chart-carrying element in definite predetermined relationship to a selected time-position on said chart, and adapted to engage said lever to deflect it in its normal plane of action in opposition to said spring, whereby said chart may be brought to rest with said selected time position in a definite relationship to said marking member, and manually actuated means to displace a part of said lever perpendicularly to said plane, said lever yielding to permit such displacement and thereby being disengaged from said moving member and rendering said spring free to exert its normal tendency.

WALTER S. PARSONS.